(No Model.)

W. B. MILLER.
NUT LOCK.

No. 382,999. Patented May 15, 1888.

Witnesses.
Harry L. Amer
J. J. Masson

Inventor:
Walton B. Miller
by E. E. Masson.
atty.

UNITED STATES PATENT OFFICE.

WALTON B. MILLER, OF STRASBURG, PENNSYLVANIA, ASSIGNOR OF ONE-HALF TO EZRA F. LANDIS, OF LANCASTER, PENNSYLVANIA.

NUT-LOCK.

SPECIFICATION forming part of Letters Patent No. 382,999, dated May 15, 1888.

Application filed November 12, 1887. Serial No. 254,987. (No model.)

*To all whom it may concern:*

Be it known that I, WALTON B. MILLER, a citizen of the United States of America, residing at Strasburg, in the county of Lancaster and State of Pennsylvania, have invented certain new and useful Improvements in Nut-Locks, of which the following is a specification, reference being had therein to the accompanying drawings.

My invention relates to improvements in nut-locks, in which a peculiarly-shaped washer and key are used to retain a nut locked to the bolt; and the object of my improvement is to provide simple and inexpensive means to lock an ordinary nut upon a screw-threaded bolt of usual form by means of a washer and a key. I accomplish these objects by the construction illustrated in the accompanying drawings, in which—

Figure 1:
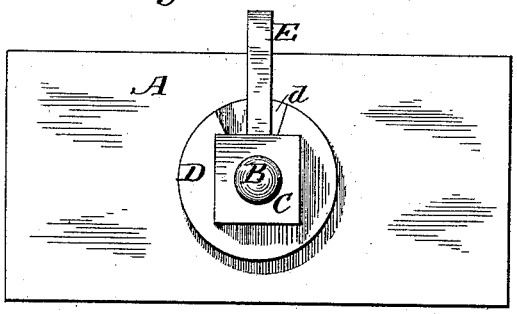
Figure 2:
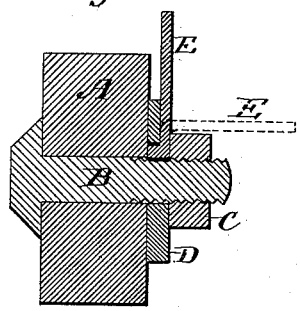
Figure 3:
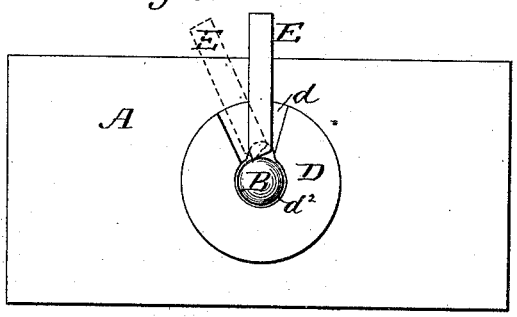
Figure 4:
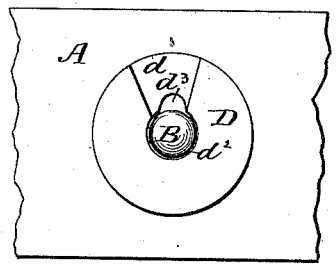
Figure 5:
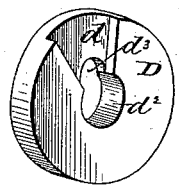
Figure 6:
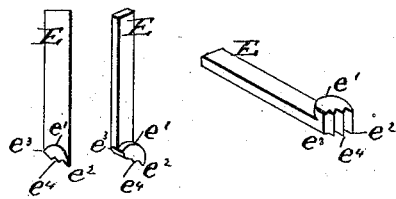

Figure 1 represents a nut locked upon its bolt and support by means of a washer and key constructed in accordance with my invention. Fig. 2 is a transverse vertical section through the nut and parts shown in Fig. 1. Fig. 3 represents a front view of all the parts shown in Fig. 1, except the nut that is removed. Fig. 4 represents a front view of the improved washer mounted upon its bolt and support. Fig. 5 is a perspective view of said washer. Fig. 6 represents in rear view and perspective the locking-key constructed in accordance with my invention.

Similar letters refer to similar parts throughout the several views.

In said drawings, A represents a bolt-support that may be the fish-plate and ends of railroad-rails or any piece of machinery on which it is thought best to have bolts provided with nut-locks.

B represents a bolt having its periphery screw-threaded, but preferably free from longitudinal grooves that would materially increase its cost.

The nut C is of any ordinary form found ready made on the market, but the washer D and the locking-key E are of peculiar form and construction. The face of the washer has a segmental recess, $d$, therein for the reception of the body of the key and to allow the latter to be moved sidewise therein. The washer is perforated centrally at $d^2$ for the passage of the bolt, and the walls of said perforation have an eccentric recess, $d^3$, of semicircular form, communicating with the central perforation, $d^2$, and located in the inner portion of the segmental recess $d$ of said washer to receive the lateral projection $e$ on the inner end of the key E. Said projection is of segmental form and has its lower end beveled or cut at an acute angle to one of its sides, the edge $e^2$ being longer than the edge $e^3$, and said beveled end may have serrations $e^4$. The top $e'$ of the projection $e'$ is segmental, and of such size and curvature as to substantially fit into the eccentric recess $d^3$ of the washer, so that when placed in said recess the face $e^4$ at its inner end rests upon the tread of the bolt; but if after the nut c has been run upon the thread of the bolt as far as it will go the key E is tilted, as shown by dotted lines in Fig. 3, the long edge $e^2$ of said key will indent the thread of the bolt and become locked thereon, as if it were a part of said bolt, and if the free end of the key is bent down, as shown by dotted lines, Fig. 2, upon one of the flat sides of the nut, the latter becomes locked to the bolt, and is thus immovable thereon until the key has been unbent.

Having now fully described my invention, I claim—

1. In combination with a bolt and nut, a washer having besides its central perforation a segmental recess, $d$, and an eccentric recess, $d^3$, communicating with said central perforation, and a key having a lateral projection adapted to enter said eccentric recess and provided with an acute edge to engage with the threads of the bolt, substantially as and for the purpose described.

2. In combination with a bolt and nut, a washer having a segmental recess, $d$, cut out of its face, a central perforation for the passage of the bolt, and an eccentric recess, $d^3$, communicating with said central perforation and extending throughout the washer, and a key having laterally an eccentric projection beveled at its inner end and received into the recess of the washer for engagement with the threads of the bolt, substantially as and for the purpose described.

In testimony whereof I affix my signature in presence of two witnesses.

WALTON B. MILLER.

Witnesses:
JOHN W. APPEL,
T. B. HOLAHAN.